(12) United States Patent
Song et al.

(10) Patent No.: US 12,449,093 B2
(45) Date of Patent: Oct. 21, 2025

(54) PRESSURE VESSEL

(71) Applicant: WAL Fuel Systems USA Inc., Livonia, MI (US)

(72) Inventors: Xiankai Song, Livonia, MI (US); Sami Siddiqui, Livonia, MI (US); Longhan Chen, Livonia, MI (US)

(73) Assignee: WAL Fuel Systems USA Inc., Livonia, MI (US)

( * ) Notice: Subject to any disclaimer, the term of this patent is extended or adjusted under 35 U.S.C. 154(b) by 3 days.

(21) Appl. No.: 18/352,582

(22) Filed: Jul. 14, 2023

(65) Prior Publication Data

US 2025/0020279 A1    Jan. 16, 2025

(51) Int. Cl.
*F17C 1/08* (2006.01)
*B60K 15/03* (2006.01)

(52) U.S. Cl.
CPC .......... *F17C 1/08* (2013.01); *B60K 15/03006* (2013.01); *B60K 2015/03059* (2013.01); *B60K 15/03177* (2013.01); *B60K 2015/03493* (2013.01); *F17C 2201/0109* (2013.01); *F17C 2201/0166* (2013.01); *F17C 2203/012* (2013.01); *F17C 2203/066* (2013.01); *F17C 2209/22* (2013.01); *F17C 2270/0168* (2013.01)

(58) Field of Classification Search
CPC ............... F17C 1/08; F17C 2201/0109; F17C 2201/0166; F17C 2203/012; F17C 2203/066; F17C 2209/22; F17C 2270/0168
USPC ................................. 220/581, 560.1, 560.04
See application file for complete search history.

(56) References Cited

U.S. PATENT DOCUMENTS

| | | | |
|---|---|---|---|
| 7,108,015 B2 * | 9/2006 | Lombari | F24D 3/1041 220/721 |
| 7,708,161 B2 * | 5/2010 | Barton | F24S 20/80 220/62.18 |
| 2012/0228308 A1 * | 9/2012 | Lai | F24D 3/1041 220/581 |
| 2023/0160526 A1 * | 5/2023 | Kim | F17C 1/08 220/581 |

FOREIGN PATENT DOCUMENTS

| | | | | |
|---|---|---|---|---|
| WO | 1997009561 A1 | 3/1997 | | |
| WO | WO-03060384 A2 * | 7/2003 | ............ | F24D 19/083 |
| WO | WO-2019068785 A1 * | 4/2019 | ............ | B60G 11/27 |

* cited by examiner

*Primary Examiner* — Nathan J Jenness
*Assistant Examiner* — Madison L Poos
(74) *Attorney, Agent, or Firm* — Young Basile Hanlon & MacFarlane, P.C.

(57) ABSTRACT

A pressure vessel may include a body formed of a polymeric material. The body may extend between a first end and a second end. The body may include a center column defining a first inner volume extending between the first end and the second end. A wall may be connected to the center column. The wall may surround the center column and define a second inner volume therebetween. The second inner volume may be disposed annularly around, and fluidly separate from, the first inner volume. The pressure vessel may also include a first end cap coupled to the center column at the first end and second end cap coupled to the center column at the second end. The first end cap may close off the first inner volume at the first end. The second end cap may close off the first inner volume at the second end.

20 Claims, 10 Drawing Sheets

PRESSURE VESSEL

TECHNICAL FIELD

The present disclosure relates to the technical field of automobile parts, specifically to a pressure vessel.

BACKGROUND

Pressure vessels may be used in various applications. For example, pressure vessels may be used as part of a vehicle system. Specifically, a pressure vessel may be to hold fuel (e.g., gases or liquids) at elevated pressures (e.g., pressures that exceed atmospheric pressure). Current pressure vessels are formed of metallic materials. While the pressure vessels made of metallic materials are useful and may hold fuel at elevated pressures, the metallic materials often have a high density, which increases the weight of the pressure vessel and lowers the efficiency of the vehicle system.

SUMMARY

In order to achieve the above purpose, the present disclosure provides the following technical solutions.

In certain embodiments, a pressure vessel may include a body formed of a polymeric material. The body may extend between a first end and a second end. The body may include a center column defining a first inner volume extending between the first end and the second end. A wall may be connected to the center column. The wall may surround the center column and define a second inner volume therebetween. The second inner volume may be disposed annularly around, and fluidly separate from, the first inner volume. The pressure vessel may also include a first end cap coupled to the center column at the first end and second end cap coupled to the center column at the second end. The first end cap may close off the first inner volume at the first end. The second end cap may close off the first inner volume at the second end.

The pressure vessel may include internal ribs each extending through the second inner volume. Each internal rib may be connected to the wall and the center column to support the wall relative to the center column.

The internal ribs may extend between the first end and the second end of the body. Each of the internal ribs may define a gap that allows fluid communication within the second inner volume across the internal ribs.

Each of the internal ribs may extend radially between a proximal end connected to the center column and a distal end connected to the wall.

The wall may include arc segments and peaks arranged in series. The peaks may be individually disposed between the arc segments, and projecting toward the center column.

Each of the internal ribs may extend to capture one of the peaks corresponding thereto.

The wall may include an outer surface facing away from the center column. The wall may also include external ribs extending from the outer surface to provide structural support to the wall.

The external ribs may be arranged to form a pattern comprising at least one of a radial pattern, a diamond pattern, a honeycomb pattern, a square pattern, a rectangular pattern, and a triangular pattern.

The center column may include a first annular surface at the first end of the body. The first end cap may include a second annular surface. The first annular surface may abut the second annular surface.

The first end cap may be connected to the center column at the abutment of the first annular surface and the second annular surface by welding.

The body may include a first portion including the first end and a second portion including the second end. The first portion and the second portion may be connected to one another at a seam formed by welding.

A subset of the first inner volume corresponding to the first portion may have a first draft angle. A subset of the second inner volume corresponding to the first portion may have a second draft angle.

The first portion and the second portion may be substantially symmetric about the seam.

The first inner volume may be smaller than the second inner volume.

The center column may include a first opening in fluid communication with the first inner volume. The wall may include a second opening in fluid communication with the second inner volume.

Alternatively, a pressure vessel may include a center column formed of a polymeric material. The center column may include a first part and a second part. The first part may include a first surface. The second part may include a second surface abutting and securing to the first surface. The pressure vessel may also include a wall formed of the polymeric material. The wall may encircle the center column. The wall may include a first segment and a second segment. The first segment may include a third surface. The second segment may include a fourth surface abutting and securing to the third surface.

The second surface may be welded to the first surface. The fourth surface may be welded to the third surface.

The pressure vessel may include first internal ribs. Each of the first internal ribs may monolithically extend from an exterior of the first part to an interior of the first segment. Each of the second internal ribs may monolithically extend from an exterior of the second part to an interior of the second segment.

The first segment and the second segment may each include arc segments and peaks arranged in series. The peaks may be individually disposed between the arc segments, and projecting toward the center column. Each of the first internal ribs may extend to capture one of the peaks corresponding to the first segment. Each of the second internal ribs may extend to capture one of the peaks corresponding to the second segment.

In selected embodiments, a method of assembling a pressure vessel may include obtaining a body formed of a polymeric material. The body may extend between a first end and a second end. The body may include a center column defining a first inner volume extending between the first end and the second end. The body may also include a wall coupled to the center column. The wall may surround the center column and define a second inner volume therebetween. The second inner volume may be disposed annularly around, and fluidly separate from, the first inner volume. The method may also include coupling a first end cap to the center column at the first end to close off the first inner volume at the first end. The method may also include coupling a second end cap to the center column at the second end to close off the first inner volume at the second end.

BRIEF DESCRIPTION OF THE DRAWINGS

The disclosure is best understood from the following detailed description when read in conjunction with the accompanying drawings. It is emphasized that, according to common practice, the various features of the drawings may be not to-scale. On the contrary, the dimensions of the various features may be arbitrarily expanded or reduced for clarity.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments of the present disclosure, all other embodiments obtained by those of ordinary skill in the art without creative effort shall fall within the protection scope of the present disclosure.

Figure 1:
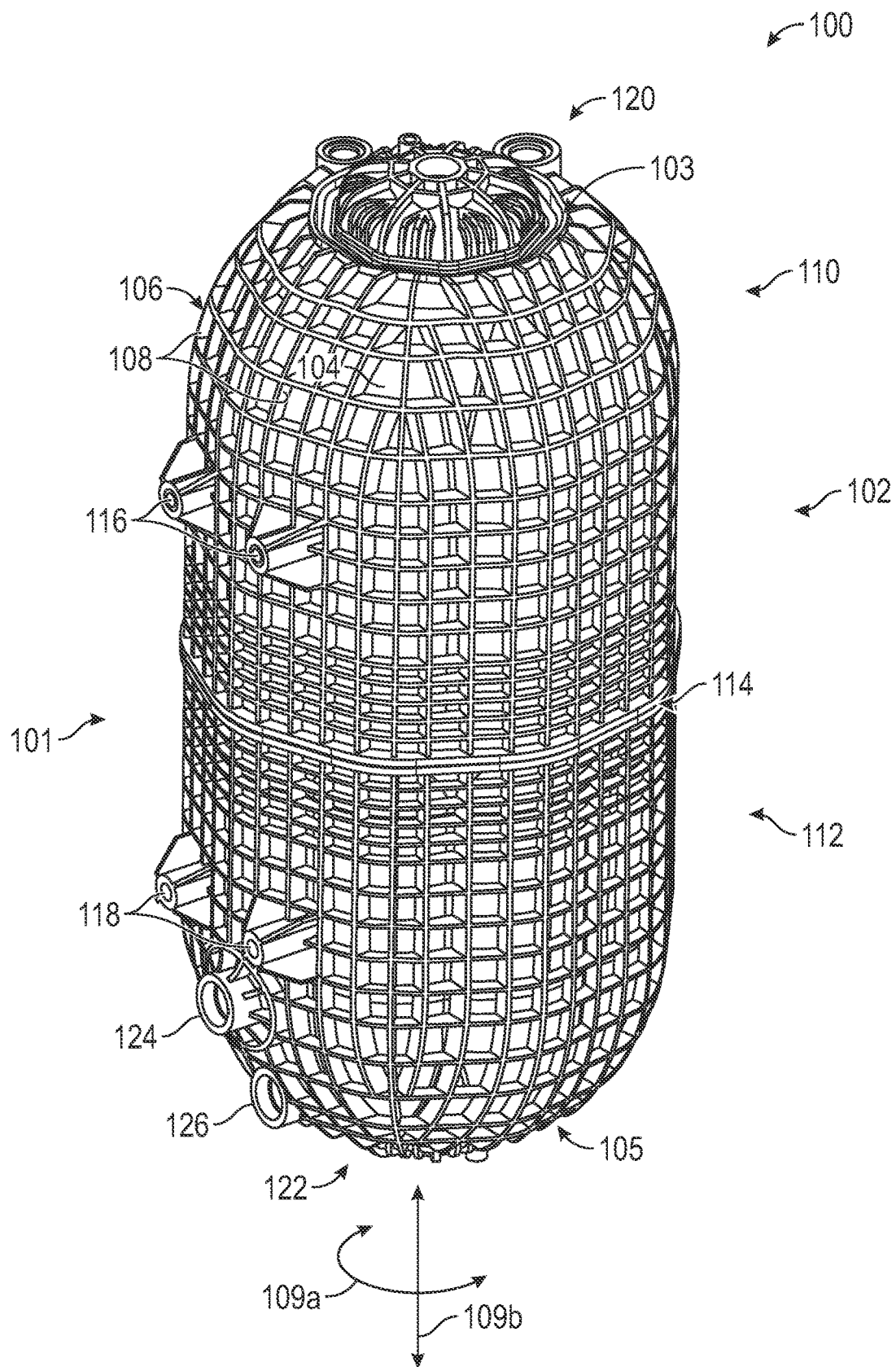
FIG. 1 is a perspective view of one embodiment of a pressure vessel in an assembled configuration.

Referring to FIG. 1, in selected embodiments, a pressure vessel 100 may be configured to store one or more fluids. The pressure vessel 100 may be used in various applications. For example, the pressure vessel 100 may be used as part of a vehicle system. Specifically, the pressure vessel 100 may be to hold fuel (e.g., gases or liquids) at elevated pressures (e.g., pressures that exceed atmospheric pressure). The pressure vessel 100 may help store fuel that may be used by an engine and may dispense the fuel at a flow rate needed by the engine, which then may burn the fuel to generate energy to propel the vehicle.

In certain embodiments, the pressure vessel 100 may be formed of polymeric material having various reinforcements as desired or necessary. Polymeric material may offer several benefits due to its being lightweight and easily formable. The lightweight property of polymeric material may contribute to reducing the weight of a vehicle that incorporates or used the pressure vessel 100. This reduction in weight may enhance the overall fuel efficiency of the vehicle by reducing operational costs, pollutant emissions, etc. At the same time, with the application of various reinforcements, a pressure vessel 100 formed of polymeric material may also be capable of resolving stresses associated with elevated pressure within the pressure vessel 100 and preventing leaks, ensuring the safe and reliable use of the pressure vessel 100, and the like.

In selected embodiments, the pressure vessel 100 may comprise a wall 102 defining the shape and total volume of the pressure vessel 100. The shape may be cylindrical or tubular. The wall 102 may include of a barrier 104 and a support portion 106 providing structural support to the barrier 104.

In selected embodiments, the barrier 104 may be formed of a polymeric material. The support portion 106 may also be formed of a polymeric material. The polymeric material of the support portion 106 may be the same as or different from the polymeric material forming the barrier 104. The barrier 104 and the support portion 106 may be monolithic, which refers a single piece of material without joints or seams. As a result, it may provide increased resistance to leaks and elevated pressures.

In certain embodiments, the support portion 106 may be or comprise external ribs 108 arranged on an outer surface of the barrier 104. The external ribs 108 may be reinforcing ribs reinforcing and providing support to the barrier 104. A thickness of the external ribs 108 may range from about 1 mm to about 3 mm. In another example, the thickness of the external ribs 108 may range from about 2 mm to about 3 mm. In another example, the thickness of the external ribs 108 may range from about 2.2 mm to about 2.7 mm. The external ribs 108 may be arranged in any suitable pattern.

As the local stresses imposed on the different portions of the pressure vessel 100 may be different, the pattern may vary across those different portions in order to properly support the barrier 104. For example, the pattern, spacing between the external ribs 108, thickness and depth of the external ribs 108, or the like may be selected to provide a desired strength to the support portion 106. In selected embodiments, the external ribs 108 or a subset thereof may form a radial pattern (e.g., external ribs 108 that extend radially away from sub-component such as an aperture or port in the pressure vessel 100). Alternatively or in addition thereto, the external ribs 108 may intersect so as to formed a particular shape (e.g., a repeating shape) therebetween. For example, the external ribs 108 or a subset thereof may intersect to form a diamond pattern, a honeycomb pattern, a square pattern, a rectangular pattern, a triangular pattern, and the like or a combination or sub-combination thereof. Stated differently, the external ribs 108 may be arranged to form a pattern comprising at least one of a radial pattern, a diamond pattern, a honeycomb pattern, a square pattern, a rectangular patter, and a triangular pattern.

In certain embodiments, the pattern may be or comprise external ribs 108 that extend circumferentially (i.e., in a circumferential direction 109a) around the pressure vessel 100, external ribs 108 that extend axially (i.e., in an axial direction 109b) with respect to the pressure vessel 100, or the like or a combination or sub-combination thereof. Intersections between such ribs may be orthogonal, or at some other angle. For example, as the external ribs 108 that extend axially approach an end of the pressure vessel 100, they may converge or the like and cross the external ribs 108 that extend circumferentially at an angle that is less than or more than ninety degrees.

From a technological standpoint, it may be easier to form the external ribs 108 in certain locations on the pressure vessel 100 in different patterns than on other locations. Accordingly, the patterns for particular areas may be selected to provide a desired support strength, manufacturability, economy of material (e.g., efficient or optimal use of the material used to form the pressure vessel 100), or the like. In selected embodiments, the external ribs 108 forming in a radial pattern may be used around one or more apertures or ports in the pressure vessel 100, while the external ribs 108 forming a diamond pattern, a honeycomb pattern, a square pattern, rectangular pattern, or the like may be effective over large portions or the majority of the pressure vessel 100. In certain embodiments, to resolve or carry hope stress, certain portions of a pressure vessel 100 may include a higher density of external ribs 108 that extend circumferentially around the pressure vessel 100. That is, the external ribs 108 that extend circumferential may be closer together (e.g., have a reduced spacing in the axial direction 109*b* therebetween) so as to increase a load carrying capacity of selected regions or portion of the pressure vessel 100.

The pressure vessel 100 may further comprise one or more reinforcement rings surrounding the barrier 104 to provide additional structural rigidity to the pressure vessel 100. More specifically, the reinforcement rings may be disposed along the support portion 106 and be configured to reduce expansion of the pressure vessel 100 when filled with a fluid. The reinforcement rings may be comprised of a metal, polymer, ceramic, or any other suitable material. Moreover, the reinforcement rings may coupled to the barrier 104 and/or the support portion 106 by an interference fit, bonding, welding, etc. Furthermore, the reinforcement rings may be integrally formed with the barrier 104 and/or the support portion 106 from a common material, such as a polymer.

Figure 2:
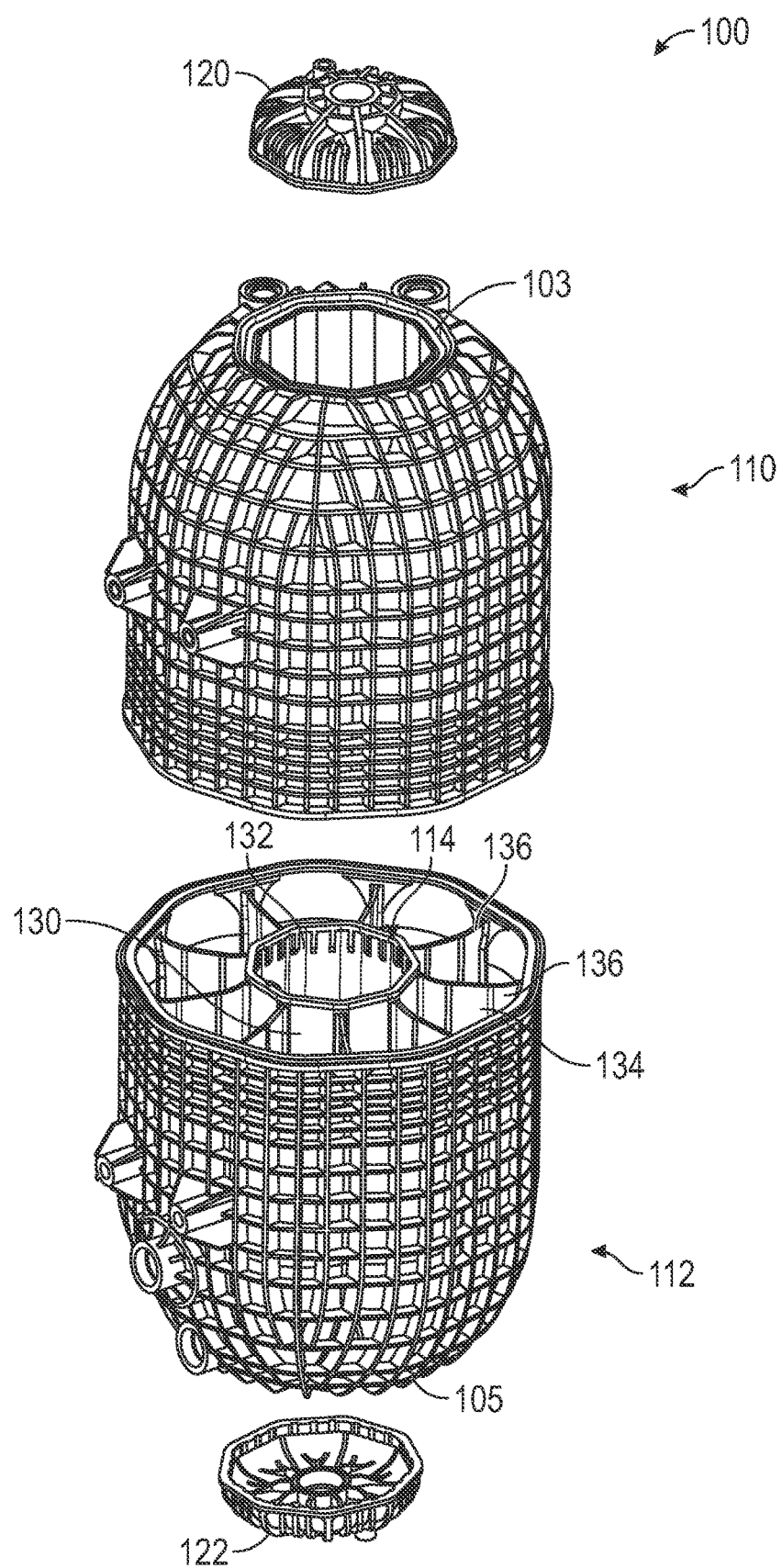
FIG. 2 is a perspective, exploded view of the pressure vessel of FIG. 1.
Figure 3:
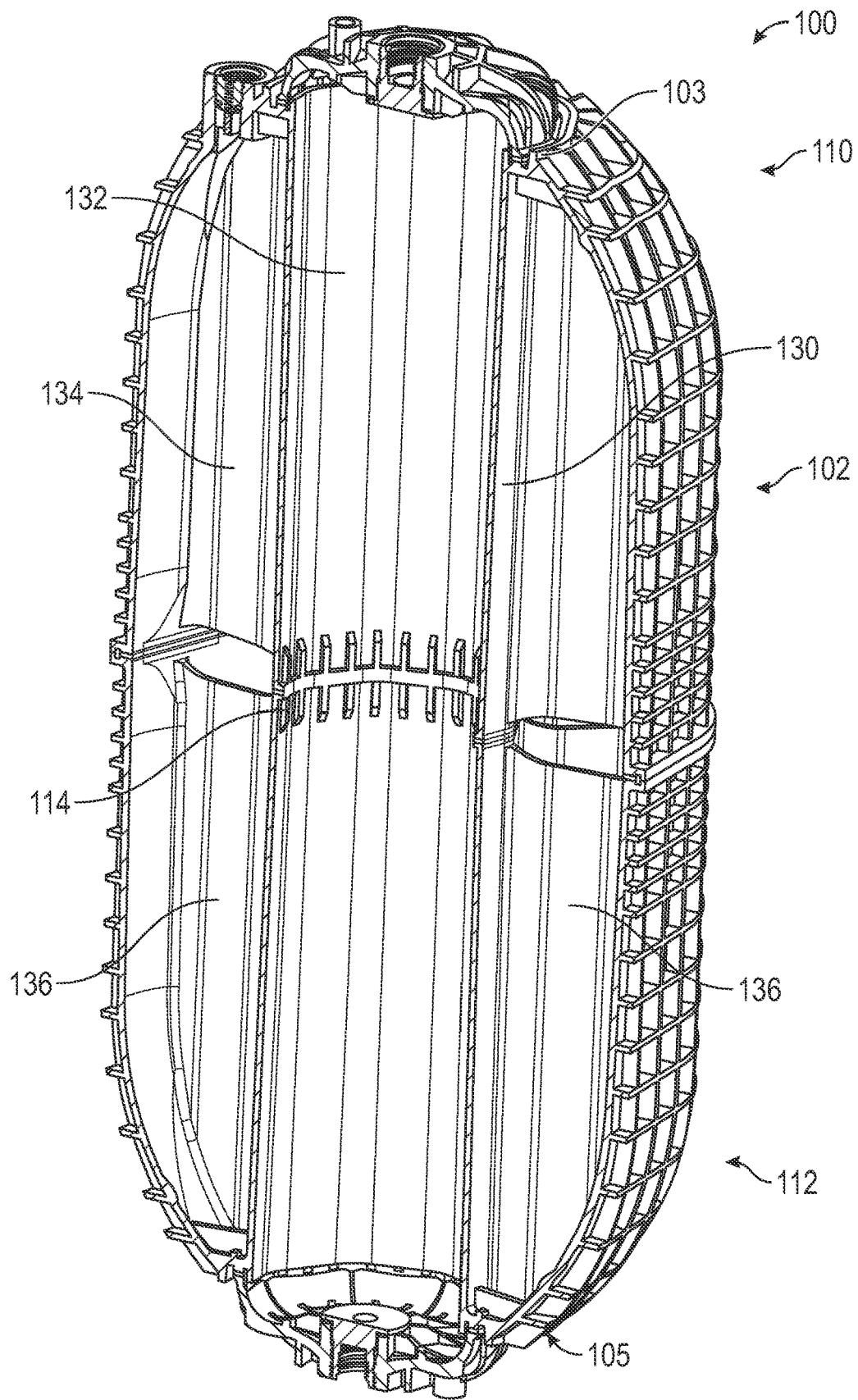
FIG. 3 is a perspective, cross-sectional view of the pressure vessel of FIG. 1.

In selected embodiments, the pressure vessel 100 may include a body 101. The body 101 may extend between a first end 103 and a second end 105. The body 101 may include an upper shell 110 (i.e., a first portion) and a lower shell 112 (i.e., a second portion). The upper shell 110 and the lower shell 112 may be substantially similar in structure to one another to promote ease of manufacturing and reduce production costs. The upper shell 110 may contain a first section of the barrier 104, and the lower shell 112 may contain a second section of the barrier 104. Similarly, the upper shell 110 may contain a first section of the support portion 106, and the lower shell 112 may contain a second section of the support portion 106. In other words, the upper shell 110 may contain a first segment of the wall 102, and the lower shell 112 may contain a second segment of the wall 102. One end of the upper shell 110 may be connected securely to one end of the lower shell 112 by welding (e.g., friction or ultrasonic welding) or the like. When welding, the selected areas or surfaces of the upper shell 110 and the lower shell 112 may abut to form a welded seam 114 when the material melt and fuse together during a welding process such that the upper shell 110 (i.e., the first portion) and the lower shell 112 (i.e., the second portion) are substantially symmetric about the seam 114, as seen in FIGS. 1-3, for example. The selected areas may include annular areas in the first segment of the wall 102 and the second segment of the wall 102.

In certain embodiments, the upper shell 110 may include one or more first mounts 116 and the lower shell 112 may include one or more second mounts 118. The first mounts 116 and the second mounts 118 may be used to secure the pressure vessel 100 to a surface or some other component or structure in a larger system. For example, the first mounts 116 and the second mounts 118 may be used to secure the pressure vessel 100 to one or more other parts of a vehicle system. The first mounts 116 and the second mounts 118 may provide a stable base to register the pressure vessel 100 with respect to a structural frame, chassis, or the like, thereby preventing any movement or disgorgement of the pressure vessel 100 during use and/or transport (e.g., while the vehicle is in motion).

In selected embodiments, the pressure vessel 100 may include a first end cap 120 and a second end cap 122 positioned opposite one another at opposite ends of the pressure vessel 100 in the axial direction 109*b*. More specifically, the first end cap 120 may be securely connected to the upper shell 110 (e.g., by welding or the like) at the first end 103. The second end cap 122 may be securely connected to the lower shell 112 (e.g., by welding or the like) at the second end 105. The first end cap 120 and the second end cap 122 may be similar (e.g., identical) in structure. In other embodiments, the upper shell 110 and the lower shell 112 shaped to close off at the first end 103 and the second end 105, respectively, making the first end cap 120 and the second end cap 122 unnecessary. As such, in certain embodiments the pressure vessel 100 may be formed without the first end cap 120 and the second end cap 122.

In certain embodiments, the lower shell 112 may include a first opening 124 and a second opening 126. The first opening 124 and the second opening 126 may be formed on a portion of the wall 102. The first opening 124 and the second opening 126 may provide locations for liquids and/or gases to pass into or out of the pressure vessel 100. In selected embodiments, the first opening 124 and the second opening 126 may be formed to support engagement therewith. For example, the first opening 124 and the second opening 126 may be formed with threads or the like that enable complementary structures such as valves, conduits, or the like to secure thereto in a sealed or leak-resistant manner.

Referring to FIGS. 2 and 3, in selected embodiments, the body 101 may define a first inner volume 132 and a second inner volume 134 that are in fluid-separation from each other, such that the first inner volume 132 and the second inner volume 134 may operate independently with no direct exchange of gases or fluids between them. The body 101 may include a center column 130 that encloses the first inner volume 132. As such, the center column 130 defines a first inner volume 132 extending between the first end 103 and the second end 105. The center column 130 also serves as the barrier to separate the first inner volume 132 from the second inner volume 134. The wall 102 surrounds the center column 130 and defines an outer surface facing away from the center column 130. The center column 130 and the wall 102 enclose the second inner volume 134 and define a second inner volume 134. The second inner volume 134 is disposed annularly around, and fluidly separate from, the first inner volume. The first inner volume 132 may be smaller in size than the second inner volume 134. The utilization of two different sized cavities may allow for efficient use of gas energy in vehicle operations. The larger inner volume may be well-suited to handle high-demand tasks like driving brakes, while the smaller inner volume may be optimal for low-demand tasks like parking brakes.

In certain embodiments, the body 101 may comprise internal ribs 136 arranged in the second inner volume 134. The internal ribs 136 may be tensile ribs, which experience tension loading when the pressure vessel 100 is charged or pressurized. The internal ribs 136 may extend axially from the first end 103 of the body 101 on the upper shell 110 approaching the welded seam 114. Similarly, the internal ribs 136 may extend axially from the second end 105 of the lower shell 112 approaching the welded seam 114. The internal ribs 136 in the upper shell 110 and the lower shell 112 may join together at the welded seam. Alternatively, the internal ribs 136 in the upper shell 110 and the lower shell 112 may not intersect and instead leave a gap where the internal ribs 136 extend. This gap provides a pathway for fluid or gas exchange between the upper shell 110 and the lower shell 112 and facilitates fluid exchange within the second inner volume 134.

In selected embodiments, one end of each of the internal ribs 136 (i.e., a distal end) may be connected to the wall 102, and the other end of each of the internal ribs 136 (i.e., a proximal end) may be connected to an outer wall of the center column 130. The internal rib may extend in a direction from a center of the center column 130 to a perimeter of the wall 102. The internal ribs 136, the wall 102, and the outer wall of the center column 130 may create a stable structure that makes the pressure vessel 100 into one cohesive piece. This design may allow the pressure vessel 100 to maintain its structural integrity even when the internal pressure greatly exceeds the external pressure. The interconnected nature of the internal ribs 136, the wall 102, and the center column 130 may make the pressure vessel 100 tolerate elevated pressures and retain shape. Additionally, the design may help distribute stress and pressure evenly throughout the pressure vessel 100, reducing the risk of weak points or vulnerable areas. A thickness of each internal rib may range from about 1 mm to about 5 mm. In another example, the thickness of each internal rib may range from about 2 mm to about 4 mm. In another example, the thickness of each internal rib may range from about 2.4 mm to about 3.9 mm.

In certain embodiments, the upper shell 110 may contain a first part of the center column 130, and the lower shell 112 may contain a second part of the center column 130. One end of the upper shell 110 may be connected securely to one end of the lower shell 112 by welding (e.g., friction or ultrasonic welding) or the like. When welding, the selected areas or surfaces of the upper shell 110 and the lower shell 112 may abut to form the welded seam 114 when the material melt and fuse together during a welding process. The selected areas may include annular areas in the first part of the center column 130 and the second part of the center column 130.

Figure 4A:
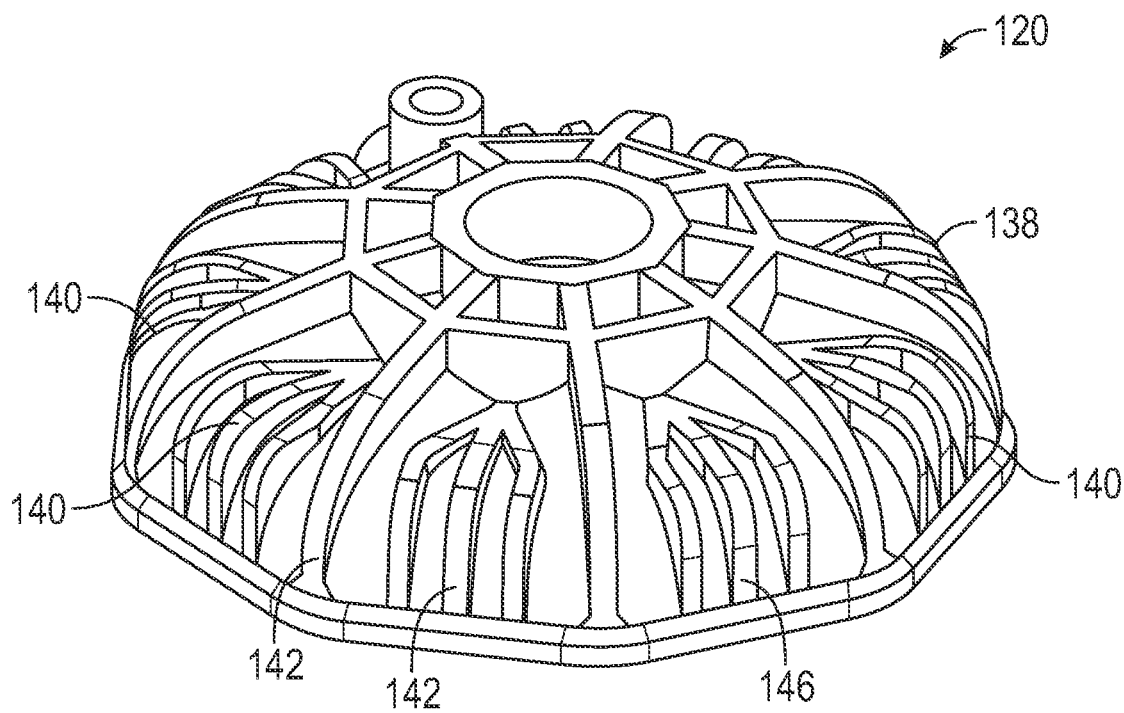
FIG. 4A is a perspective, top view of an end cap of the pressure vessel of FIG. 1.
Figure 4B:
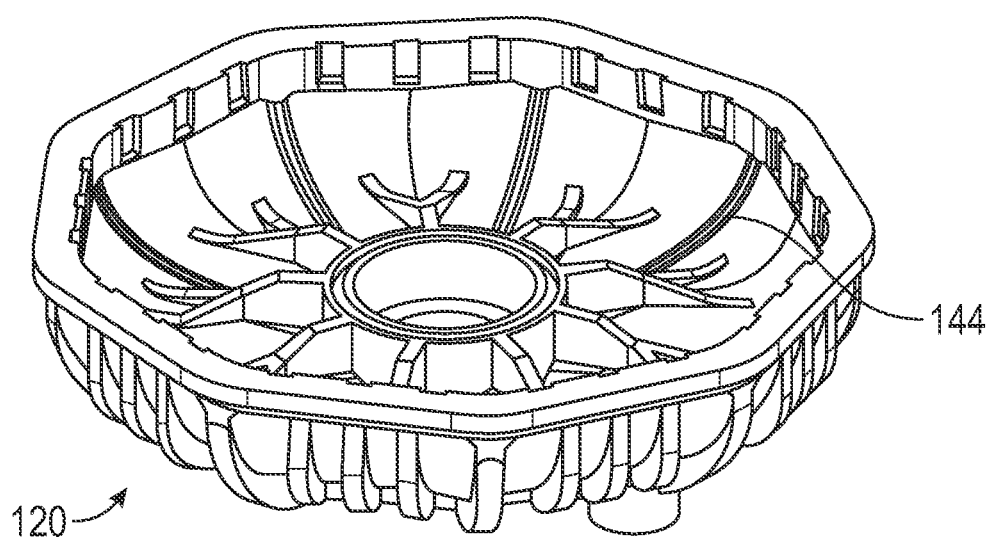
FIG. 4B is a perspective, bottom view of the end cap of FIG. 4A.

Referring to FIGS. 4A and 4B, in certain embodiments, the first end cap 120 may include a top surface 138. The top surface 138 may include multiple and identical iterations o the sub-sections 140 that cooperate to form the top surface 138. The first end cap 120 may include outer ribs 142 positioned on an exterior of the top surface 138 and separate or delineate each of the sub-sections 140. Each of the outer ribs 142 may extend radially from a central portion of the first end cap 120 to a perimeter of the first end cap 120. The outer ribs 142 may increase the strength or stiffness of the first end cap 120 in the axial direction. As a result, the first end cap 120 may have greater resistance to bending in the axial direction. For example, when an elevated pressure (e.g., 5 MPa pressure) is applied in the axial direction, the first end cap 120 may retain its shape and avoid bulging or bowing out in the axial direction.

In selected embodiments, the first end cap 120 may include inner ribs 144 positioned on an interior of the top surface 138. Each of the inner ribs 144 may extend radially from a central portion of the first end cap 120 toward a perimeter of the first end cap 120. Like the outer ribs 142, the inner ribs 144 may increase the strength or stiffness of the first end cap 120 in the axial direction. As a result, due to the combination of the outer ribs 142 and the inner ribs 144, the first end cap 120 may have greater resistance to bending, bulging, or bowing out in the axial direction.

In certain embodiments, the inner ribs 144 may be positioned directly interior to a sub-set 146 of the outer ribs 142. For example, a sub-set 146 of the outer ribs 142 may extend radial away from a central portion of the first end cap 120 and then divide or branch out as they extend toward the perimeter of the first end cap 120. Similarly, the inner ribs 144 may be positioned directly interior to the sub-set 146 of the outer ribs 142 and may also extend radial away from a central portion of the first end cap 120 and then divide or branch out as they extend toward the perimeter of the first end cap 120. Thus, the section modulus of certain portions of the first end cap 120 may be a combination of both the outer ribs 142 and the inner ribs 144.

In selected embodiments, each of the sub-sections 140 of the structure may create an arch in the middle of a portion of the top surface 138 corresponding thereto. The arch of each of the sub-sections 140 may produce something like corrugations extending radially outward from the central portion of the first end cap 120. The arch of each of the sub-sections 140 may enable the structure to deflect, or change shape, in response to external forces applied thereto. As a result, the first end cap 120 may be able to deform or move with the upper shell 110 as desired or necessary. For example, when the upper shell 110 expands circumferentially, the first end cap 120 may also expand or flex circumferentially. Conversely, when the upper shell 110 shrinks or contracts circumferentially, the first end cap 120 may also shrink or contract circumferentially.

In one method of assembling the pressure vessel 100, the upper shell 110 may be connected securely to the first end cap 120 by welding (e.g., friction or ultrasonic welding) or the like at the first end 103. For example, in the welding process, the corresponding areas or surfaces (e.g., annular surfaces) of the upper shell 110 and the first end cap 120 may abut and the material thereof may melt and fuse together. The ability of the first end cap 120 to circumferentially flex to harmoniously track the circumferential movement of the upper shell 110 may improve the toughness or durability corresponding to the seam (e.g., the welded seam) therebetween in the pressure vessel 100.

In the embodiments discussed above, various features or structures are presented in the context or as part of the upper shell 110. All such features or structures may be included as part of the lower shell 112. For example, in welding process, the corresponding areas or surfaces (e.g., annular surfaces) of the lower shell 112 and the second end cap 122 may abut.

In view of the foregoing, while the outer ribs 142 and the inner ribs 144 may resist flexing, bending, bulging, bowing, etc. of the first end cap 120 in the axial direction, the outer ribs 142 and the inner ribs 144 may provide little resistance to circumferential expansion or contraction. Moreover, the arch of each of the sub-sections 140 may enable or facilitate such circumferential expansion or contraction. Thus, the first end cap 120 may handle or resolve significant loads in the axial direction without excessive flexing, while still being sufficient flexible to accommodate circumferential expansion and contraction of the upper shell 110.

Figure 5:
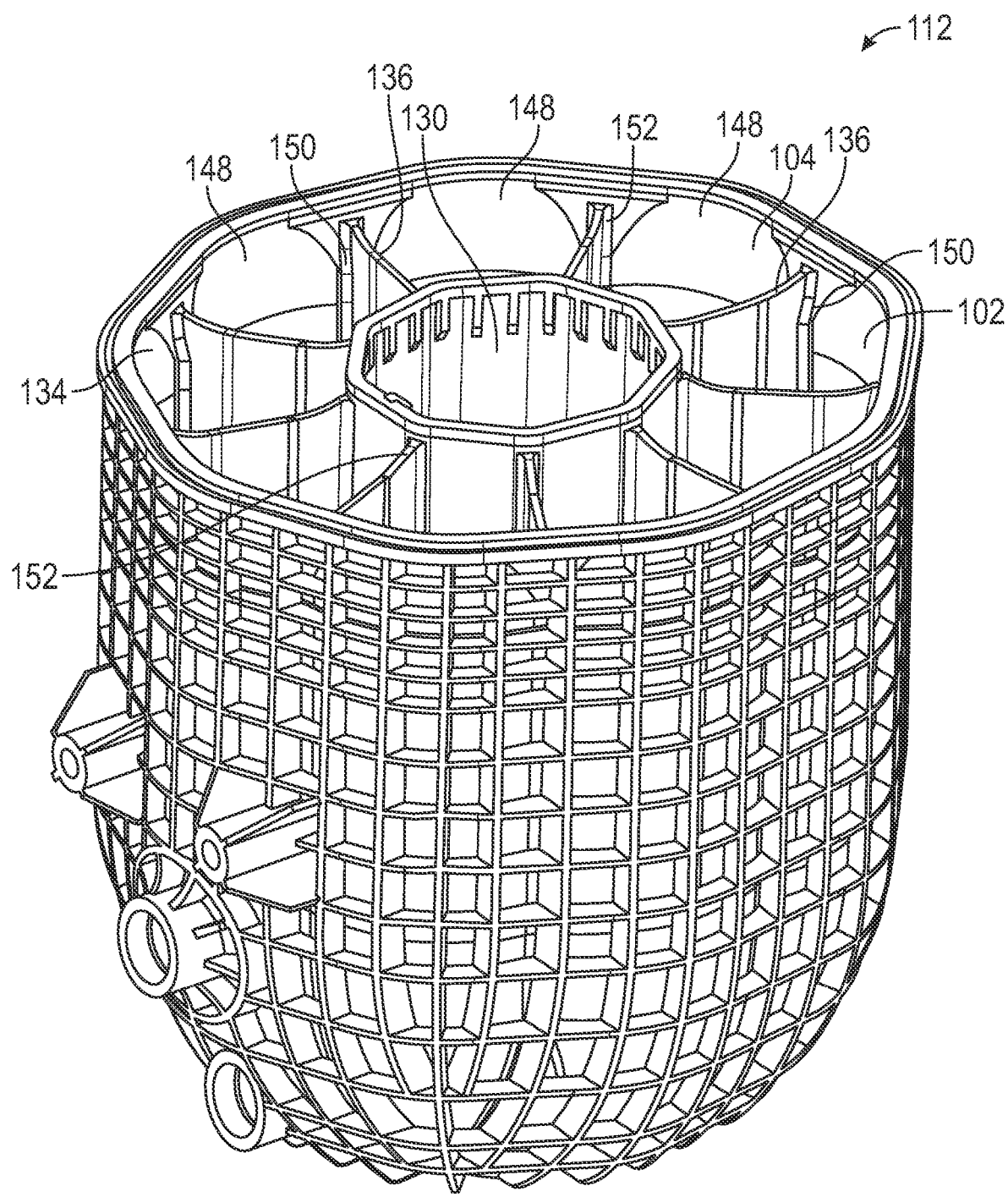
FIG. 5 is a perspective view of a lower shell of the pressure vessel of FIG. 1.
Figure 6:
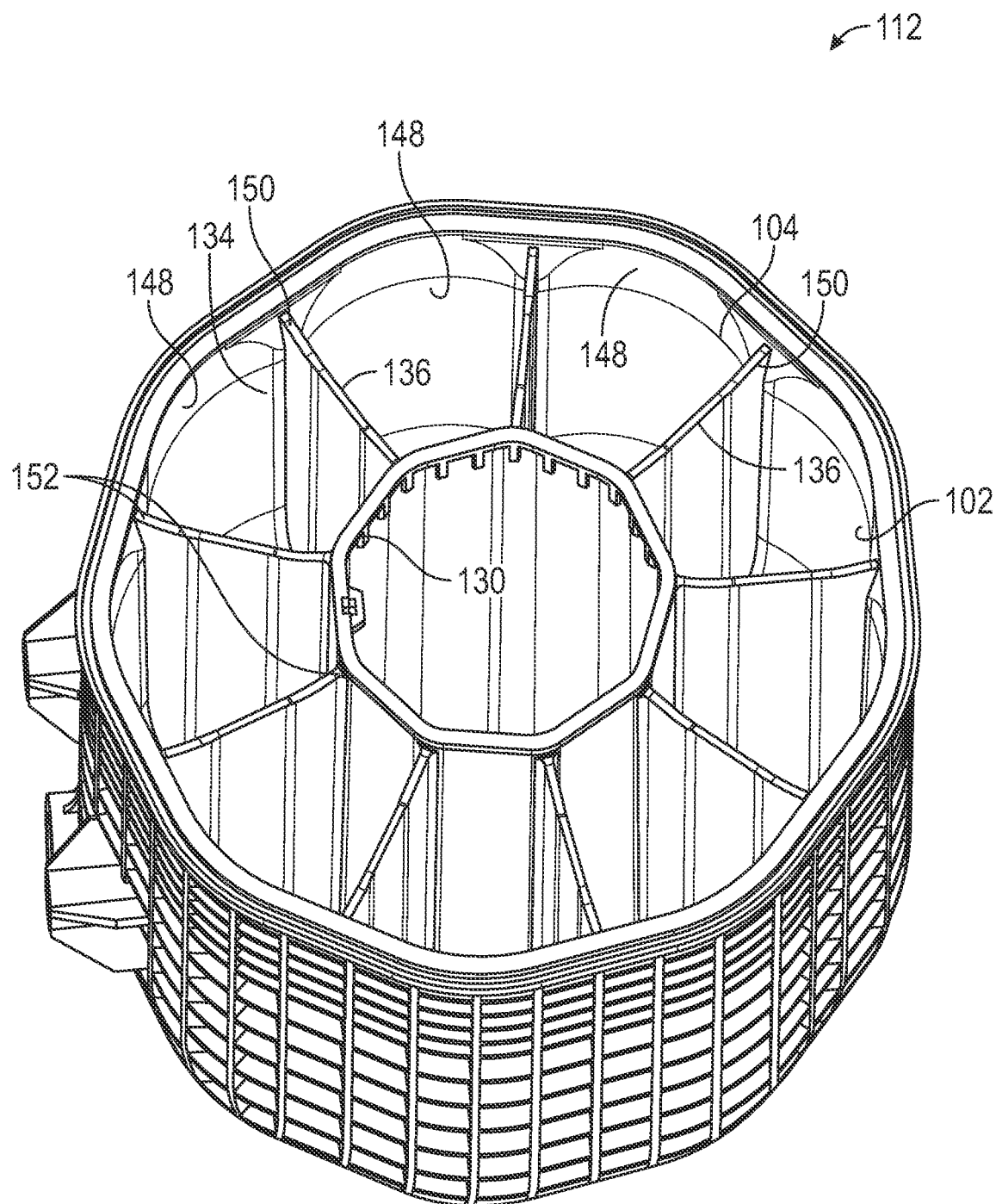
FIG. 6 is another perspective view of the lower shell of FIG. 5.
Figure 7:
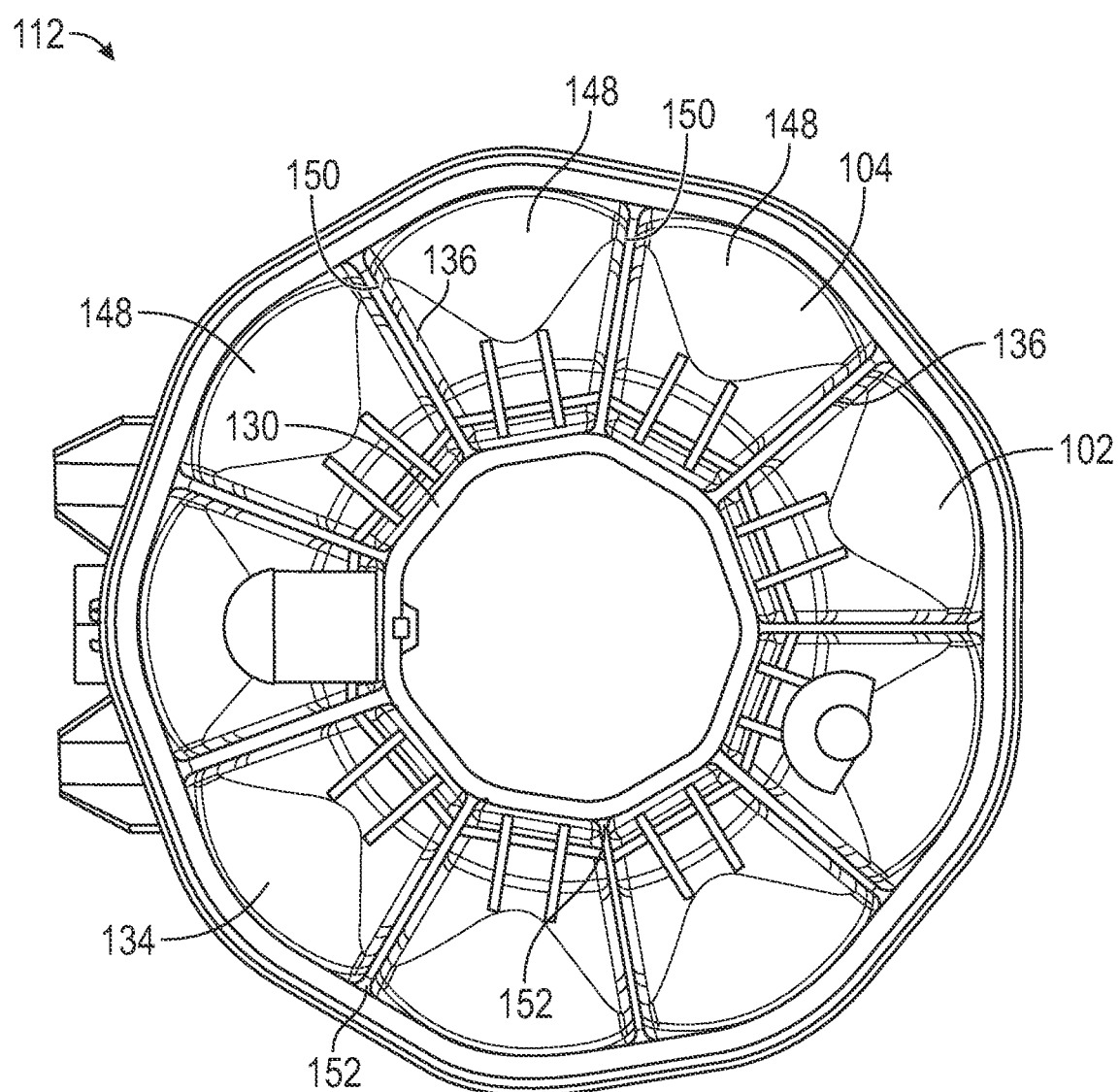
FIG. 7 is a top view of the lower shell of FIG. 5.

Referring to FIGS. 5-7, in certain embodiments, the wall 102 of the lower shell 112 may include arc segments 148. The arc segments 148 may form a part of the barrier 104. The arc segments 148 adjacent to one another may connect together to form petal-like structures or lobes that surround or encircle center column 130. That is, the petal-like structures or lobes may be formed by connecting multiple arc segments 148 in circumferential sequence, which may result in a petal-like appearance of the barrier 104 of the lower shell 112. This petal-like appearance may increase a surface area of the barrier 104 and enhance the strength of the lower shell 112. For example, in the event of elevated pressures inside the pressure vessel 100, certain stress concentrations in the lower shell 112 may be reduced by the curvature and more gradual or smoother transitions provided by the petal-like structures. Thus, due to the smooth curvature and radiuses of the arc segments 148, the wall 102 may withstand higher internal pressures.

In selected embodiments, the arc segments 148 may be connected in sequence to form the petal-like structures, with peaks 150 arranged in series and formed at the locations where arc segments 148 that are adjacent to one another join. The peaks 150 are individually disposed between the arc segments 148 with the peaks 150 projecting towards the center column 130 such that each of the internal ribs 136 extends to capture one of the peaks 150 corresponding thereto. The peaks 150 may protrude into the second inner volume 134 of the pressure vessel 100. To strengthen the pressure vessel 100 (e.g., increase the ability of the pressure vessel 100 to withstand elevated internal pressures), the internal ribs 136 may extend from the barrier 104 of the lower shell 112 near the peaks 150. For example, when two arc segments 148 are adjacent to each other, they may combine and form one of the peaks 150. To provide support to one of the peaks 150, one of the internal ribs 136 may extend therefrom toward the center column 130. One of the internal ribs 136 may be monolithically formed with one of the peaks 150 for added strength.

The body 101 may include fillets 152 formed at the transition of the internal ribs 136 and the barrier 104 and at the transition of the internal ribs 136 and the center column 130. The fillets 152 may relieve stress concentrations that may otherwise correspond to those areas. In this manner, each of the internal ribs 136 may be monolithically formed with the center column 130 and a respective one of the peaks 150 and increase the ability of the pressure vessel 100 to withstand elevated internal pressures. Alternatively, the body 101 may include radiuses or other like components formed at the transition of the internal ribs 136 and the barrier 104 and at the transition of the internal ribs 136 and the center column 130.

In certain embodiments, the internal ribs 136 may each extend as a single unit from a respective one of the peaks 150. Alternatively, the internal ribs 136 may branch or divide into two rib segments as the internal ribs 136 reach the peaks 150. Thus, rather than have a single line of engagement between each of the internal ribs 136 and the barrier 104, there may be multiple lines of engagement between each of the internal ribs 136 and the barrier 104. For example, each of the internal ribs 136 may branch into two rib segments to create two lines of engagement between each of the internal ribs 136 and the barrier 104. Thus, each of the peaks 150 may be bracketed between rib segments of a corresponding one of the internal ribs 136. This branching may allow for greater flexibility in relieving stress concentrations in the wall 102, thereby ensuring that the petal-like structure maintains its shape and structural integrity even under elevated pressures. This arrangement may provide additional structural support to the pressure vessel 100 and enhance the strength of the overall design, even when it is formed of polymeric material (e.g., thermoplastic material) in a molding process.

In selected embodiments, a cross section of the center column 130 orthogonal to axial direction 109b may have a circular shape. Alternatively, the cross section may have a polygonal shape. The number of sides of the polygonal shape may be the same as the number of the arc segments 148 forming the petal-like structures. For example, if five arc segments form the barrier 104 of the lower shell 112, then the cross section of the center column 130 may be shaped as a pentagon. In the illustrated embodiment, the cross section has a nonagonal shape (i.e., forms a nine-sided polygon). In selected embodiments, the cross section may have a polygonal shape of between about 5 and about 10 sides. In general, having more sides (and consequently more internal ribs 136 and corresponding lobes of the petal-like structures) may correspond to or enable a pressure vessel 100 have a greater strength or ability to resist increased internal pressure.

In the embodiments discussed above, various features or structures are presented in the context or as part of the lower shell 112. All such features or structures may be included as part of the upper shell 110. For example, the upper shell 110 may include arc segments 148 that form petal-like structures, peaks 150, internal ribs 136, external ribs 108, and/or the like as described above.

Figure 8:
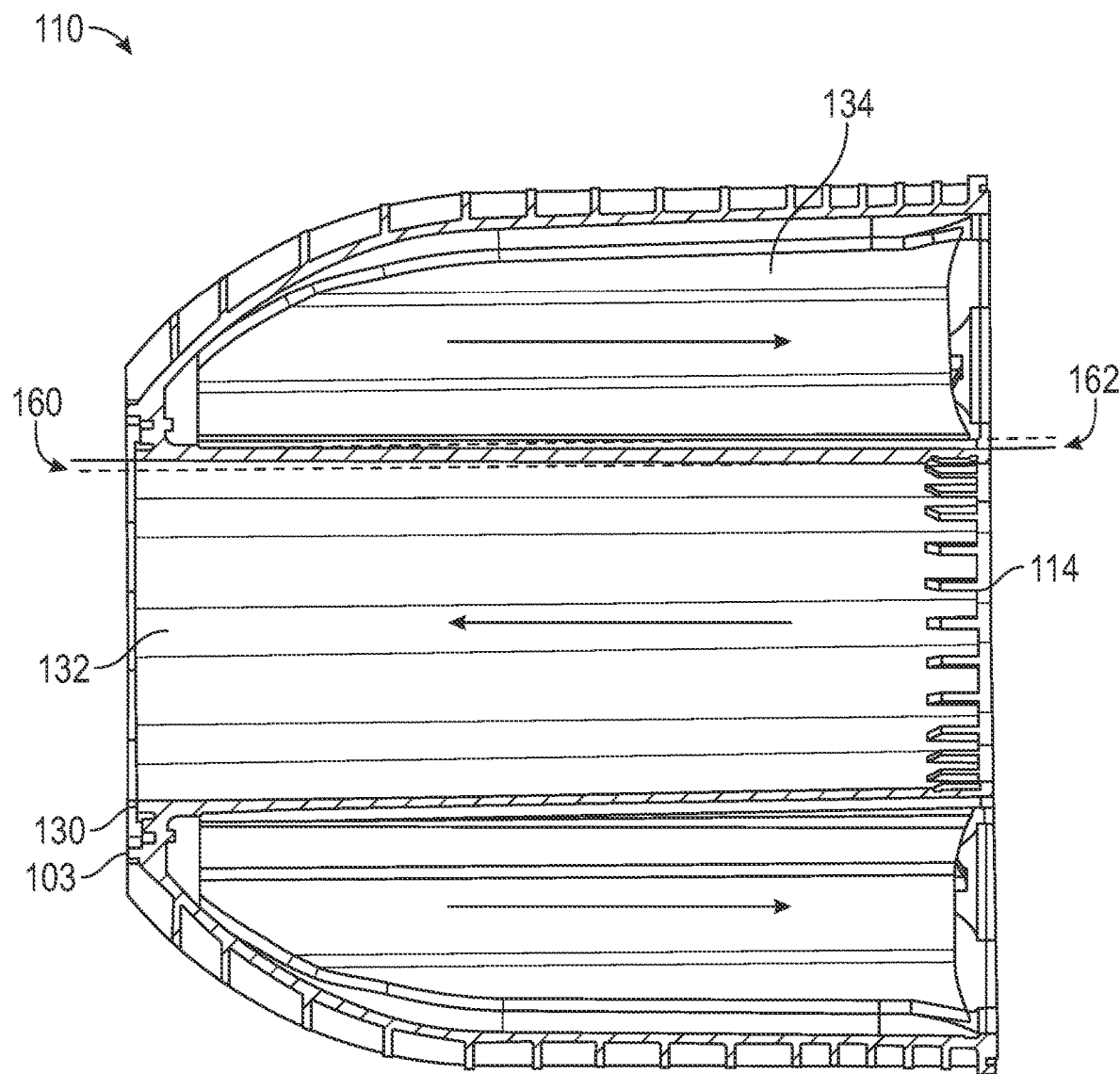
FIG. 8 is a cross-sectional view of an upper shell of the pressure vessel of FIG. 1.

Referring to FIG. 8, in certain embodiments, one or more instances of the upper shell 110 may be released or ejected from a mold during a molding process. In order to form various structures of an upper shell 110, different portions of the mold may pull away in different directions to release or eject the resulting part from a mold inner volume defined within the mold. That is, different components may combine to define the mold inner volume and one or more of those different components may be moved or pulled to release the resulting part from the mold inner volume. In selected embodiments, multiple cores may define certain interior cavities of the upper shell 110. Those multiple cores may be pulled or move with respect to one another in different directions (e.g., opposite directions) in order to release the upper shell 110 from the mold inner volume.

For example, the mold may include a first mold core or section and a second mold core or section. The first mold core may correspond to and define the first inner volume 132. The second mold core may correspond to and define the second inner volume 134. The center column 130 of the upper shell 110 may be moved or be released from the first mold core by moving in a first releasing direction aligned with the axial direction. Accordingly, the first mold core may have a first draft angle 160 selected to enable or facilitate such movement and/or release. In selected embodiments, the first release direction may correspond to the first mold core moving away from the welding surface of the upper shell 110 and out of the center column 130 through the end to which the first end cap 120 will eventually attach (i.e., the first end 103).

The second inner volume 134 and the internal ribs 136 therewithin may be defined by the second mold core. The barrier 104 of the upper shell 110 may be moved or be released from the second mold core by moving in a second releasing direction aligned with the axial direction. Accordingly, the second mold core may have a second draft angle 162 selected to enable or facilitate such movement and/or release. In selected embodiments, the second release direction may correspond to the second mold core moving away from the first end 103 and out the end corresponding to the welding surface of the upper shell 110. Thus, the direction of taper for the draft associated with the first mold core and the interior of the center column 130 may be opposite to the direction of taper for the draft associated with the second mold core, the exterior of the center column 130, and the interior of the barrier 104.

That is, the draft corresponding to the first draft angle 160 may produce or result in a sloping outward, away from a surface of the first mold section (i.e., a surface near the welded seam 114). As a result, the first mold core may be narrower near the welded seam 114 than the first end 103.

Conversely, the draft corresponding to the second draft angle 162 may produce or result in sloping outward, away from a surface of the second mold section (i.e., a surface near the first end 103). As a result, the second mold section may be wider near the welded seam 114 than the first end 103.

In the manner described above, adjacent or opposing surface of the first mold core and the second mold core may be substantially parallel in the area or inner volume that defines the center column 130. This configuration may allow for the center column 130 to have a uniform and relatively small thickness, while enabling the upper shell 110 to be released from the mold with minimal effort, binding, or damage. In certain embodiments, the lower shell 112 may be formed with similar cores, draft angles, etc. Accordingly, the lower shell 112 may have the same advantages as the upper shell 110 and be released or ejected from mold during a molding process in a similar manner described above. The first draft angle 160 or the second draft angle 162 may be between about 0.10 and about 1°. In another example, the first draft angle 160 or the second draft angle 162 may be between about 0.30 and about 0.8°. In another example, the first draft angle 160 or the second draft angle 162 may be about 0.6°.

Figure 9:
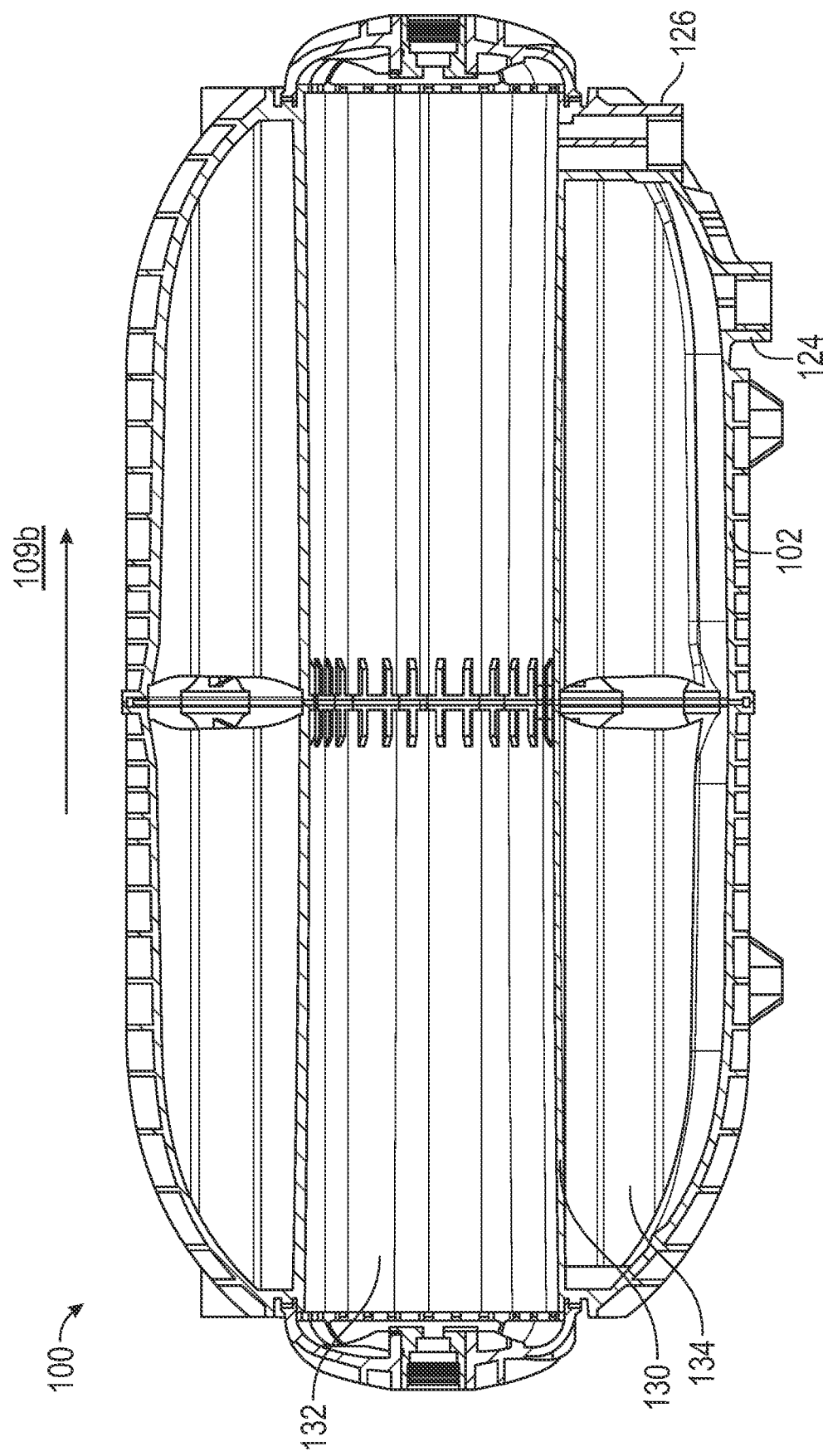
FIG. 9 is another perspective, cross-sectional view of the pressure vessel of FIG. 1.
Figure 10:
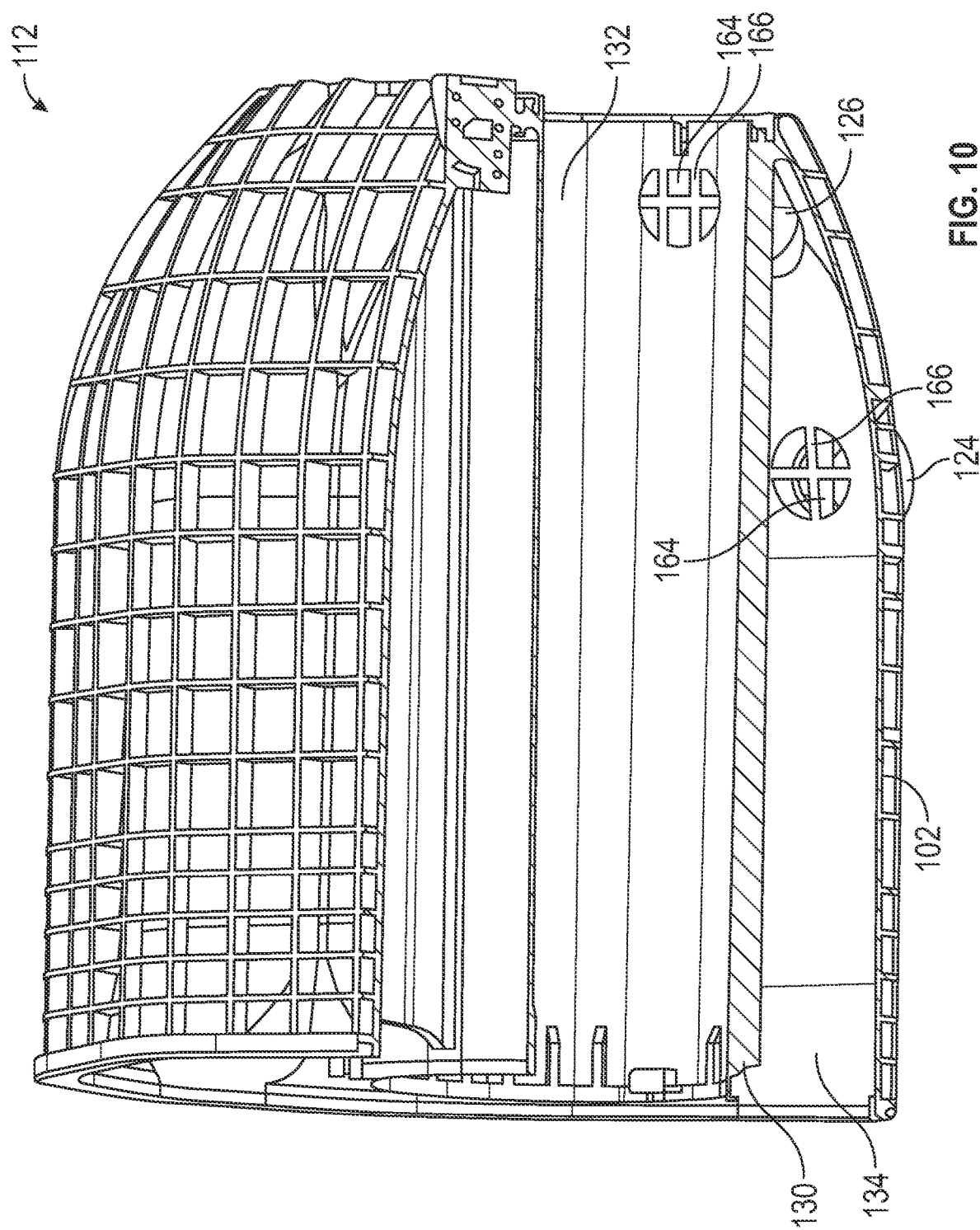
FIG. 10 is another perspective, cross-sectional view of the lower shell of FIG. 5.

Referring to FIGS. 9 and 10, in selected embodiments, the first opening 124 may be formed on a section of the wall 102. The first opening 124 may extend through the wall 102. In certain embodiments, the first opening 124 may comprise multiple apertures 164 or paths that extending through the wall 102. For example, the first opening 124 may be circular in cross section. The body 101 may include dividing walls 166 that subdivide the first opening 124 into the multiple apertures 164. In selected embodiments, the dividing walls 166 may reinforce or strengthen the first opening 124. The first opening 124 may allow liquids and/or gases to pass into or out of the second inner volume 134, establishing communication between the second inner volume 134 and the exterior environment.

In certain embodiments, the second opening 126 may be formed on a section of the wall 102 and a section of the center column 130. The second opening 126 may extend through the center column 130 and the wall 102. In certain embodiments, the second opening 126 may comprise multiple apertures 164 or paths that extending through the center column 130 and the wall 102. For example, the second opening 126 may be circular in cross section. The dividing walls 166 may subdivide the second opening 126 into the multiple apertures 164. In selected embodiments, the dividing walls 166 may reinforce or strengthen the second opening 126. The second opening 126 may allow liquids and/or gases to pass into or out of the first inner volume 132, establishing communication between the first inner volume 132 and the exterior environment.

In selected embodiments, the pressure vessel 100 may be equipped for mounted to another structure. For example, the pressure vessel 100 may be equipped for mounting with a vehicle. In certain embodiments, the pressure vessel 100 may be equipped to mount at a slight angle or tilt. The tilt may allow the pressure vessel 100 to be secured with the axial direction 190b not parallel to the mounting surface. This arrangement may facilitate the flow of liquids from a higher level to a lower level, as an angle of tilt can be adjusted to promote efficient flow (e.g., in a system that requires gravity to move liquids) to the first opening 124, the second opening 126, or both the first opening 124 and the second opening 126.

The angle of tilt may be selected to overcome the first draft angle 160. That is, if the pressure vessel 100 were mounted with the axial direction 109b parallel to the horizontal, then the first draft angle 160 may prevent a small quantity of liquid at one end of the pressure vessel 100 from completely exiting out the second opening 126 located at an opposite end of the pressure vessel 100. To overcome the first draft angle 160, a tilt may suffice. That is, the tilt may be smaller than one degree. The tilt may compensate for the draft angle. For example, if the draft angle is 0.5°, the tilt is about or greater than 0.6°. Accordingly, the tilt may enable liquid to flow out of the first inner volume 132 more easily and liquid to more easily flow out of the second inner volume 134 through the first opening 124.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

It should be noted in the embodiments of the present disclosure that, in the description of the present disclosure, orientations or positional relationships indicated by the terms "radial," "axial," "upper," "lower," "inner," "outer," "front," "rear,". "left," "right," "center" and the like orientations or positional relationships shown in the drawings, which are only for convenience of description and do not indicate or imply a device or elements need to have a particular orientation, be constructed, and be operated in a particular orientation and are therefore not to be construed as limitations to the present disclosure.

In addition, it should be noted in the embodiments of the present disclosure that, in the description of the present disclosure, unless otherwise expressly specified and limited, the terms "set," "mounted," "connected" and "coupled" should be understood in a broad sense. For example, it may be a fixed connection, a detachable connection, or an integral connection; it may be a mechanical connection; it may be a direct connection, or an indirect connection through an intermediate medium, and it may be internal communication between two elements.

What is claimed is:

1. A pressure vessel comprising:
   a body extending between a first end and a second end, the body comprising:
      a center column defining a first inner volume extending between the first end and the second end; and
      a wall coupled to the center column, wherein the wall surrounds the center column and defines a second inner volume therebetween, and wherein the second inner volume is disposed annularly around, and fluidly separate from, the first inner volume, wherein the body is formed of a polymeric material and is configured to maintain structural integrity when internal pressure exceeds external pressure such that the first inner volume and the second inner volume retain each shape and are each fixed;
   a first end cap coupled to the center column at the first end and configured to close off the first inner volume at the first end; and
   a second end cap coupled to the center column at the second end and configured to close off the first inner volume at the second end.

2. The pressure vessel of claim 1, further comprising internal ribs each extending through the second inner volume and connected to the wall and the center column to support the wall relative to the center column.

3. The pressure vessel of claim 2, wherein the internal ribs extend between the first end and the second end of the body, with each of the internal ribs defining a gap that allows fluid communication within the second inner volume across the internal ribs.

4. The pressure vessel of claim 3, wherein each of the internal ribs extends radially between a proximal end connected to the center column and a distal end connected to the wall.

5. The pressure vessel of claim 4, wherein the wall comprises arc segments and peaks arranged in series with the peaks individually disposed between the arc segments, with the peaks projecting toward the center column.

6. The pressure vessel of claim 5, wherein each of the internal ribs extends to capture one of the peaks corresponding thereto.

7. The pressure vessel of claim 1, wherein the wall comprises an outer surface facing away from the center column, with the wall further comprising external ribs extending from the outer surface to provide structural support to the wall.

8. The pressure vessel of claim 7, wherein the external ribs are arranged to form a pattern comprising at least one of a radial pattern, a diamond pattern, a honeycomb pattern, a square pattern, a rectangular pattern, and a triangular pattern.

9. The pressure vessel of claim 1, wherein:
the center column comprises a first annular surface at the first end of the body;
the first end cap comprises a second annular surface; and
the first annular surface abuts the second annular surface.

10. The pressure vessel of claim 9, wherein the first end cap is connected to the center column at the abutment of the first annular surface and the second annular surface by welding.

11. The pressure vessel of claim 1, wherein the body includes a first portion comprising the first end and a second portion comprising the second end, with the first portion and the second portion connected to one another at a seam formed by welding.

12. The pressure vessel of claim 11, wherein:
a subset of the first inner volume corresponding to the first portion has a first draft angle; and
a subset of the second inner volume corresponding to the first portion has a second draft angle.

13. The pressure vessel of claim 11, wherein the first portion and the second portion are substantially symmetric about the seam.

14. The pressure vessel of claim 1, wherein the first inner volume is smaller than the second inner volume.

15. The pressure vessel of claim 1, wherein the center column comprises a first opening in fluid communication with the first inner volume, and wherein the wall comprises a second opening in fluid communication with the second inner volume.

16. A pressure vessel comprising:
a center column defining a first inner volume and comprising a first part and a second part, wherein
the first part comprises a first surface, and
the second part comprises a second surface abutting and securing to the first surface; and
a wall defining a second inner volume and encircling the center column, wherein the wall comprises a first segment and a second segment, wherein
the first segment comprises a third surface, and
the second segment comprises a fourth surface abutting and securing to the third surface, wherein the center column and the wall are formed of a polymeric material and are configured to maintain structural integrity when internal pressure exceeds external pressure such that the first inner volume and the second inner volume each retain shape and are each fixed.

17. The pressure vessel of claim 16, wherein the second surface is welded to the first surface, and the fourth surface is welded to the third surface.

18. The pressure vessel of claim 17, further comprising:
first internal ribs each monolithically extending from an exterior of the first part to an interior of the first segment; and
second internal ribs each monolithically extending from an exterior of the second part to an interior of the second segment.

19. The pressure vessel of claim 18, wherein:
the first segment and the second segment each comprises arc segments and peaks arranged in series with the peaks individually disposed between the arc segments, the peaks projecting toward the center column;
each of the first internal ribs extends to capture one of the peaks corresponding to the first segment; and
each of the second internal ribs extends to capture one of the peaks corresponding to the second segment.

20. A method of assembling a pressure vessel comprising:
obtaining a body having a first end and a second end, the body comprising a center column defining a first inner volume extending between the first end and the second end, and a wall coupled to the center column, wherein the wall surrounds the center column and defines a second inner volume therebetween, and wherein the second inner volume is disposed annularly around, and fluidly separate from, the first inner volume, wherein the body is formed of a polymeric material and is configured to maintain structural integrity when internal pressure exceeds external pressure such that the first inner volume and the second inner volume each retain shape and are each fixed;
coupling a first end cap to the center column at the first end to close off the first inner volume at the first end; and
coupling a second end cap to the center column at the second end to close off the first inner volume at the second end.

* * * * *